US006993453B2

(12) United States Patent
Krissell

(10) Patent No.: US 6,993,453 B2
(45) Date of Patent: Jan. 31, 2006

(54) ADJUSTED MONITORING IN A RELATIONAL ENVIRONMENT

(75) Inventor: Daniel L. Krissell, Morrisville, NC (US)

(73) Assignee: International Business Machines Corporation, Armonk, NY (US)

(*) Notice: Subject to any disclaimer, the term of this patent is extended or adjusted under 35 U.S.C. 154(b) by 118 days.

(21) Appl. No.: 10/695,164

(22) Filed: Oct. 28, 2003

(65) Prior Publication Data

US 2005/0091002 A1    Apr. 28, 2005

(51) Int. Cl.
 G06F 11/30    (2006.01)
(52) U.S. Cl. .................................................. 702/182
(58) Field of Classification Search ................ 702/182, 702/186, 188.1, 89, 81–84; 700/174, 178; 709/223–224; 719/318, 328
See application file for complete search history.

(56) References Cited

U.S. PATENT DOCUMENTS

| | | | |
|---|---|---|---|
| 5,564,015 A | 10/1996 | Bunnell | |
| 5,634,008 A | 5/1997 | Gaffaney et al. | |
| 5,867,659 A | 2/1999 | Otteson | |
| 5,991,708 A | 11/1999 | Levine et al. | |
| 6,026,440 A | 2/2000 | Shrader et al. | |
| 6,182,022 B1 | 1/2001 | Mayle et al. | |
| 6,265,970 B1 | 7/2001 | Whitehead | |
| 6,314,463 B1 | 11/2001 | Abbott et al. | |
| 6,438,374 B1 | 8/2002 | Bhat | |
| 6,446,029 B1 | 9/2002 | Davidson et al. | |
| 6,452,617 B1 | 9/2002 | Bates et al. | |
| 6,553,403 B1 | 4/2003 | Jarriel et al. | |
| 2005/0022185 A1* | 1/2005 | Romero | 718/100 |

FOREIGN PATENT DOCUMENTS

| | | |
|---|---|---|
| EP | 0455 946 A2 | 11/1991 |
| JP | 2002-373085 A | 12/2002 |

OTHER PUBLICATIONS

Karp et al., Windows XP in A Nutshell, Apr. 2002, O'Reilly & Associates, Inc., First Edition, pp. 298-301.*
Prorock, T.J., *Enhanced Method for Monitoring Cricitcal Resources in Token Ring Networks*, IBM® Technical Disclosure Bulletin, vol. 40, No. 1, Jan. 1997.
Anonymous Author, *Method of Polling Multiple Devices With Limited Resources, While Ensuring the Timeliness of Device Status Polling Thread Scheduler*, Article No. 428149, p. 1710, *Research Disclosure*, Disclosed by International Business Machines Corporation, Dec. 1999.

(Continued)

Primary Examiner—John Barlow
Assistant Examiner—Cindy D. Khuu
(74) Attorney, Agent, or Firm—Gerald R. Woods, Esq.; Steven M. Greenberg, Esq.; Christopher & Weisberg, P.A.

(57) ABSTRACT

A system, method and apparatus for adjustable performance monitoring in a relational environment. The system can include a registry of related applications, at least two performance monitors communicatively linked to one another and coupled to respective related applications listed in the registry, and a set of adjustable monitoring parameters for each of the performance monitors. The system further can include a policy engine coupled to at least one of the performance monitors and configured to process a policy for defining an adjustment of a corresponding set of the adjustable monitoring parameters based upon an indication received from a communicatively linked one of the performance monitors.

10 Claims, 3 Drawing Sheets

OTHER PUBLICATIONS

Anonymous Author, *Unattended Monitoring of Random, Multi-client DB2 Stress Workload*, Article No. 450153, p. 1801, *Research Disclosure*, Disclosed by International Business Machines Corporation, Oct. 2001.

Krintz., et al., *NwsAlarm: A Tool for Accurately Detecting Resource Perforance Degradation, NASA Information Power Grid Project and NASA Ames Research Center*, pp. 404-413, ©2001 IEEE.

* cited by examiner

ADJUSTED MONITORING IN A RELATIONAL ENVIRONMENT

BACKGROUND OF THE INVENTION

1. Statement of the Technical Field

The present invention relates to the field of application performance monitoring and more particularly to adjusting monitoring parameters in an application performance monitor.

2. Description of the Related Art

Decades ago, application performance related mostly to the complexity of an application and the capabilities of its host platform. In view of the simplicity of the relationship between performance and resource availability, enhanced application performance could arise only through more efficient or less complex application coding, or through an enhanced hosting platform including more memory, more caching resources, faster fixed storage, or speedier processing. As a result, until recently, little attention had been paid to the performance of an application as an indicator of anything more than merely an overly complex application, or an underpowered host platform.

The popularization of more complex, enterprise computing environments has resulted in new efforts to explore the relationship between the state of a host platform and the performance of a hosted application. To further explore the changing states of applications deployed within the enterprise, application performance monitoring systems have been developed whose purpose is to detect an impending state change of a monitored application. In furtherance of its purpose, typical performance monitoring systems can be coupled to monitored applications and can monitor resources which affect the operation of the host platform. Importantly, these resources can include both hardware and software constructs.

To differentiate between events which are considered typical and events which are considered anomalous, thresholds can be established in respect to monitored resources such that when a monitored resource produces a metric which surpasses the threshold, a state change in the application or in its host can be inferred. Specifically, only where the value of a monitored resource exceeds a threshold, an indication can be generated for the benefit of a systems administrator. In this way, the performance monitor can detect a state change in the application so as to predict an impending failure of the application or the host platform.

In the prototypical performance monitor, resource data collected in the course of monitoring the performance of an application can be collected over regular intervals, referred to in the art as cycles. Specifically, a single crossing of a threshold, or a single failure to reach a required threshold can be anomalous in nature and may not necessarily indicate an impending failure. Thus, it can be important to collect metrics for a monitored resource through course of several cycles. Where a monitored resource exceeds a threshold value, or fails to reach a threshold value multiple times over several cycles, only then can a state change be inferred. Of course, the frequency of the cycles, the number of cycles to be included in any measurement, and the threshold values can be adjusted to accurately predict an impending failure.

Nevertheless, improperly setting the parameters of a performance monitoring application can defeat the operation of the performance monitoring application itself. For instance, where the frequency of the cycles is set too high, multiple threshold crossings can be shielded from view. Conversely, where the frequency of cycles is set too low, the monitoring application can become intrusive in that the monitoring application itself can consume too many host resources. Similarly, where the threshold has been set too low, a false indication of failure can result and where the threshold has been set too high, an impending failure can go undetected.

Network administrators periodically adjust the monitoring parameters of a performance monitoring application to account for the present state of the host system. Where the network administrator deems the host system to be in a precarious state, the threshold values can be set lower and the frequency of the cycles can be set to a higher value. Conversely, where the host system seems to be operating in a reliable state, threshold values can be set higher and the frequency of the cycles can be set to a lower value. In both cases, however, the adjustment of the monitoring parameters relates only to the state of operation of a single, monitored application. Consequently, the adjustment of the monitoring parameters fails to account for the state of applications related to the monitored application. Yet, in many cases, the state of health of one application can impact the operation and performance of a dependent application.

SUMMARY OF THE INVENTION

The present invention addresses the deficiencies of the art in respect to performance monitoring and provides a novel and non-obvious method, system and apparatus for adjustable monitoring in a relational environment. The system can include a registry of related applications, at least two performance monitors communicatively linked to one another and coupled to respective related applications listed in the registry, and a set of adjustable monitoring parameters for each of the performance monitors. The system further can include a policy engine coupled to at least one of the performance monitors and configured to process a policy for defining an adjustment of a corresponding set of the adjustable monitoring parameters based upon an indication received from a communicatively linked one of the performance monitors.

A method for adjusted monitoring in a relational environment can include measuring resource values in a coupled application, detecting an indication arising from the measurement, locating an application related to the coupled application, and, transmitting a notification of the indication to a performance monitor coupled to the related application. The method further can include receiving a notification of an indication from another performance monitor, and processing the received notification in association with the coupled application. The locating step can include the step of querying a registry of related applications. Finally, the method can include adjusting performance monitor parameters responsive to the detection.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a system, method and apparatus for adjusted monitoring in a relational environment. In accordance with the present invention, a monitor configured to monitor a primary application in the relational environment can further engage in a communicative link to a registry of relationships between applications in a relational environment. The registry can include dependency information such that the performance of a dependent application can rely upon the performance of the primary application and so forth. In particular, a table can be maintained which can specify dependency relationships between different monitored applications in the environment.

When the monitor for the primary application detects an incident in the primary application, not only can the incident be processed conventionally in respect to the primary application by notifying a system administrator and possibly adjusting the monitoring parameters of the monitor to reflect the state change in the primary application, but also the monitor can notify a companion monitor for the dependent application that an incident has occurred in the primary application. Based upon the notification, the companion monitor can adjust its respective monitoring parameters to account for the state change in the primary application. In this way, the companion monitor can benefit from the knowledge acquired by the monitor for the primary application.

Figure 1:
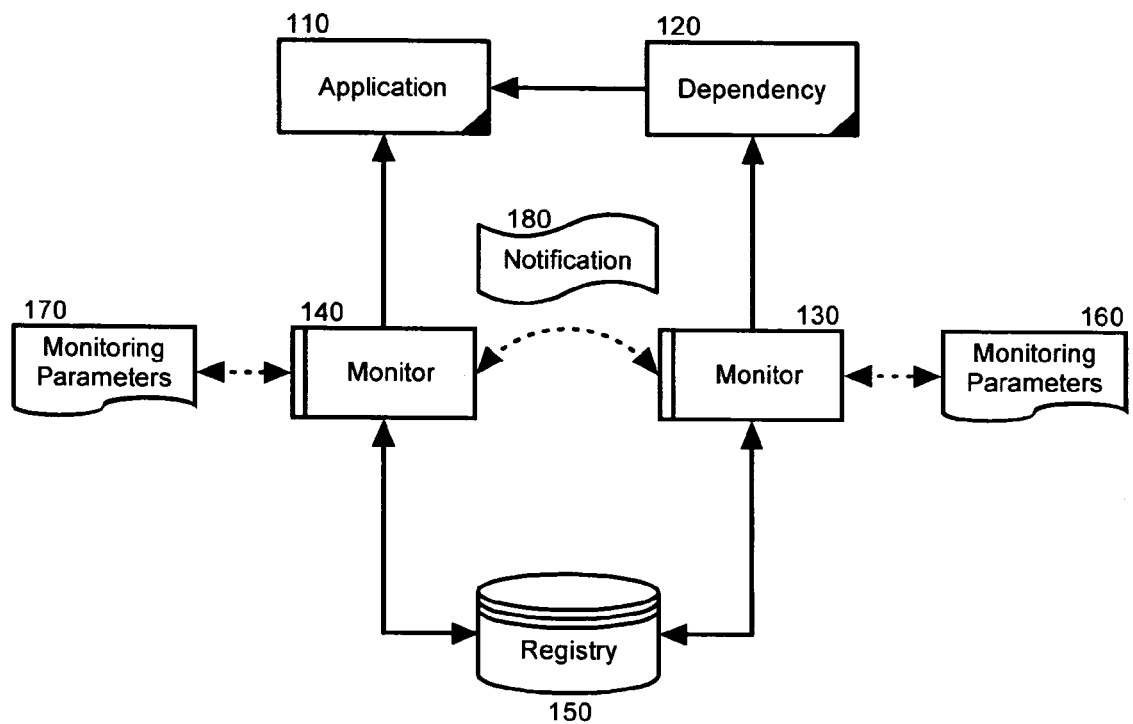
FIG. 1 is schematic illustration of a system for adjusted monitoring in a relational environment.

In more specific illustration, FIG. 1 is schematic illustration of a system for adjusted monitoring in a relational environment. The system can include two or more related applications 110, 120 co-existing in a computing environment. Each of the related applications 110, 120 can include any computing process executing within a host session such as a virtual machine, or within the process address space of a host operating system. Each of the related applications 110, 120 can be disposed together in the same host session, or across multiple host sessions wherein the related applications 110, 120 can be communicatively coupled to one another through a data communications network (not shown). Notably, either or both of the related applications 110, 120 can be dependent upon one another, for instance in the circumstance where the application 110 is a Web server dependent upon a message queue representatively embodied in the application 120.

Each of the applications 110, 120 can be monitored for performance through the operation of respective performance monitors 130, 140 according to respectively configured monitoring parameters 160, 170. Each of the performance monitors 130, 140 can enjoy a communicative coupling to the respective applications 120, 110. In this regard, the communicative coupling can include a direct coupling by way of an application programming interface or a direct vector into the event loop of the respective applications 120, 110, or an indirect coupling through coordinated communications such as through a connection-oriented protocol.

Optionally, the communicative coupling can be loose in nature by way of a subscribe/publish paradigm. In any event, the skilled artisan will recognize that the manner in which the monitors 130, 140 can be communicatively coupled to the applications 120, 100 does not affect the spirit or scope of the invention. Rather, any communicative coupling can suffice so long as the monitors 130, 140 can collect performance metrics from the applications 120, 110 to detect the occurrence of incidents which are of note and which can indicate an important state change with the respective applications 120, 110.

Notably, each of the monitors 130, 140 can be coupled to a relationship registry 150. The relationship registry can be a data store configured to store relationship information between the applications 110, 120 in the host environment. The relationship registry 150 can range from a simple correlation between one or more applications, to a specific accounting of the nature of the relationship such as which application is dependent upon the other, the location of the respective applications, known performance issues, and the like. Preferably, each of the monitors 130, 140 can access the relationship registry 150 both to discover applications which relate to the respective monitored applications 120, 110, and also to identify monitors associated with the related applications.

In operation, and for exemplary purposes only, the monitor 140 coupled to the application 110 can adjust its monitoring parameters 170 to a default state for the nominal operation of the application 110. Through the course of monitoring the performance of the application 110, the measurement of one or more resource properties which either exceed a limiting threshold, or fail to reach a prerequisite threshold can trigger an event or incident indicating a change of state in the application 110. More particularly, the occurrence of the event or incident can indicate to the monitor 140 that a failure condition may already have occurred or might be more likely to occur given the state of the application 110.

Responsive to the detection of the incident, the monitor 140 can perform any number of optional, albeit conventional steps known in the art of performance monitoring, including notifying a system administrator, and adjusting the monitoring parameters 170 to a more sensitive state. Uniquely, however, the monitor 140 further can consult the registry 150 to identify those other applications which relate to the application 110. Specifically, noting the dependent relationship between the application 110 and the application 120, the monitor 140 can forward a notification 180 to the monitor 130 indicating that an incident has been detected in the application 110. The notification 180 can simply identify the occurrence of the incident, or the notification 180 can provide a detailed accounting of the incident.

In any case, based upon the notification 180, the monitor 130 can undertake remedial action in respect to the dependent application 120, such as tuning the monitoring parameters 160 to a more sensitive state. By tuning the monitoring parameters 160 to a more sensitive state, the monitor 130 can better detect a change of state in the dependent application 120 which might occur given the state change in the application 110. Importantly, despite the consumption of additional processing resources to achieve a more sensitive state, the consumption can be justified given the higher likelihood of a state change in the application 120.

Figure 2:
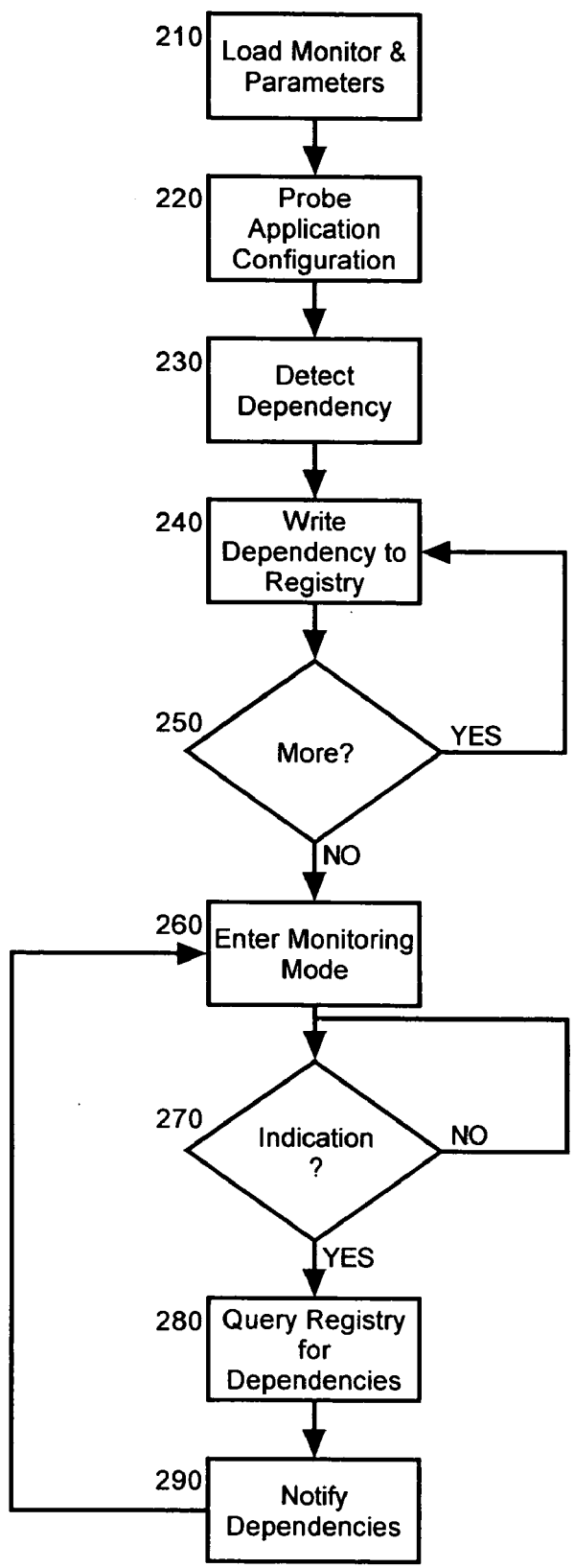
FIG. 2 is a flow chart illustrating a process for cooperative monitoring in the system of FIG. 1; and, FIG. 3 is a flow chart illustrating a process for adjusted monitoring responsive to the cooperative monitoring of FIG. 2.

To better illustrate the monitoring process of the present invention, FIG. 2 is a flow chart illustrating a reduced process for cooperatively monitoring an application in the system of FIG. 1. Beginning in block 210, the monitor can be loaded for a respective application, and the monitor can be configured for operation in accordance with specified monitoring parameters. In block 220, a communicative coupling to a registry of relationships between applications in the computing environment and relationships with other applications can be noted. Specifically, it can be determined whether the application enjoys a relationship, whether dependent or otherwise, with other applications in the computing environment.

Optionally, the process of identifying relationships can be automated such that the monitor can probe the application for particular configuration elements. Specifically, in block 230 the monitor can probe the application to infer relationships with other applications such as the dependence upon co-existing application resources. Upon discovering a relationship, the relationship data can be written to the registry in block 240. Whether performed manually or automatically, in block 250, the process can repeat until no relationships remain to be recorded in the registry.

In block 260, the monitor can be placed in a performance monitoring mode. In this regard, the monitor can measure resource values for resources within the application through the course of repetitive monitoring cycles. For each cycle, the resource values for each monitored resource can be compared to one or more respective pre-configured thresholds. When a specified number of measured values exceeds the established threshold (or where a number of measured values fails to meet a required threshold), an indication can be generated. In decision block 270, where an indication has been generated, in block 280 the registry can be queried for related resources. Subsequently, in block 290 the monitor can notify the companion monitors of the respective related resources that an indication has been detected in the monitored application.

Figure 3:
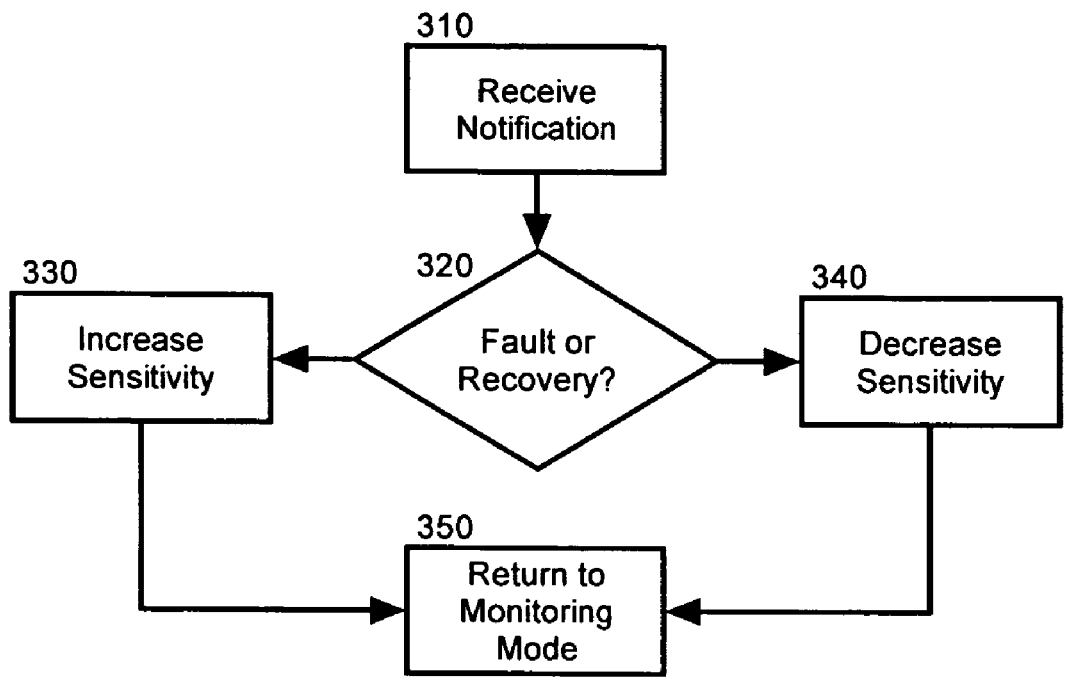

Upon receiving a notification from a monitor coupled to a related resource, each companion monitor can respond to the notification by adjusting its monitoring configuration, or by generating a notification for the benefit of a systems administrator. As an example, FIG. 3 is a flow chart illustrating a process for adjusted monitoring responsive to the cooperative monitoring of FIG. 2. Beginning in block 310, the companion monitor can receive a notification from a monitor coupled to a related application. The notification can indicate a state change in the related application which can range from an alarm that a fault condition has been detected, to a clearing event that a normative state of the related application has been restored.

In decision block 320, where an alert has been received, in block 330 the sensitivity of the performance monitor can be increased. In this regard, it can be presumed that if a fault condition has arisen in an application upon which the monitored application depends, a higher likelihood now exists that a fault condition will arise in the monitored application. Conversely, in decision block 320, where a clearing event has been received, in block 340 the sensitivity of the performance monitor can be decreased. Again, in this circumstance it can be presumed that because the related application has reached a normative state, the probability that a fault condition will arise in the monitored application will decrease. In either case, in block 350, the monitor can return to its monitoring mode.

Importantly, the process illustrated through FIGS. 2 and 3 are by no means considered to represent the exclusive embodiment of the present invention. Rather, each performance monitor can be configured to react in any number of ways to an indication so long as one or monitors coupled to related applications can be notified of the indication. While it can be advantageous to autonomically adjust the monitoring parameters to account for detected indications, in a basic embodiment, only a notification can be forwarded to a systems administrator. In contrast, in a more complex implementation, not only can an adjustment of the monitoring parameters be undertaken responsive to the receipt of an indication, but also the nature and the extent of the adjustment can be governed by policy terms dictated within a monitoring policy.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A method for adjusted monitoring in a relational environment the method comprising the steps of:
    measuring resource values in a coupled application;
    detecting an indication arising from said measurement;
    locating an application related to said coupled application; and,
    transmitting a notification of said indication to a performance monitor coupled to said related application;
    wherein said detecting step comprises comparing said measured resource values to a pre-defined threshold; and, where said measured resource values exceed said threshold, declaring an indication.

2. A method for adjusted monitoring in a relational environment the method comprising the steps of:
    measuring resource values in a coupled application;
    detecting an indication arising from said measurement;
    locating an application related to said coupled application; and,
    transmitting a notification of said indication to a performance monitor coupled to said related application;

wherein said detecting step comprises comparing said measured resource values to a pre-defined threshold; and, where said measured resource values fail to meet said threshold, declaring an indication.

3. A method for adjusted monitoring in a relational environment the method comprising the steps of:
measuring resource values in a coupled application;
detecting an indication arising from said measurement;
locating an application related to said coupled application;
transmitting a notification of said indication to a performance monitor coupled to said related application;
detecting said related application through a configuration of said coupled application; and,
recording said detected relationship in said registry.

4. A method for adjusted monitoring in a relational environment the method comprising the steps of:
measuring resource values in a coupled application;
detecting an indication arising from said measurement;
locating an application related to said coupled application;
transmitting a notification of said indication to a performance monitor coupled to said related application; and,
adjusting performance monitor parameters responsive to said detection.

5. The method of claim 4, wherein said adjusting step comprises the steps of:
loading an adjustment policy specifying limitations on adjusting performance monitor parameters in response to specific indications; and,
limiting said adjustment of said performance monitor parameters based upon said policy.

6. A machine readable storage having stored thereon a computer program for adjusted monitoring in a relational environment, the computer program comprising a routine set of instructions for causing the machine to perform the steps of:
measuring resource values in a coupled application;
detecting an indication arising from said measurement;
locating an application related to said coupled application; and,
transmitting a notification of said indication to a performance monitor coupled to said related application;
wherein said detecting step comprises comparing said measured resource values to a pre-defined threshold; and, where said measured resource values exceed said threshold, declaring an indication.

7. A machine readable storage having stored thereon a computer program for adjusted monitoring in a relational environment, the computer program comprising a routine set of instructions for causing the machine to perform the steps of:
measuring resource values in a coupled application;
detecting an indication arising from said measurement;
locating an application related to said coupled application; and,
transmitting a notification of said indication to a performance monitor coupled to said related application;
wherein said detecting step comprises comparing said measured resource values to a pre-defined threshold; and, where said measured resource values fail to meet said threshold, declaring an indication.

8. A machine readable storage having stored thereon a computer program for adjusted monitoring in a relational environment, the computer program comprising a routine set of instructions for causing the machine to perform the steps of:
measuring resource values in a coupled application;
detecting an indication arising from said measurement;
locating an application related to said coupled application;
transmitting a notification of said indication to a performance monitor coupled to said related application;
detecting said related application through a configuration of said coupled application; and,
recording said detected relationship in said registry.

9. A machine readable storage having stored thereon a computer program for adjusted monitoring in a relational environment, the computer program comprising a routine set of instructions for causing the machine to perform the steps of:
measuring resource values in a coupled application;
detecting an indication arising from said measurement;
locating an application related to said coupled application;
transmitting a notification of said indication to a performance monitor coupled to said related application; and,
adjusting performance monitor parameters responsive to said detection.

10. The machine readable storage of claim 9, wherein said adjusting step comprises the steps of:
loading an adjustment policy specifying limitations on adjusting performance monitor parameters in response to specific indications; and,
limiting said adjustment of said performance monitor parameters based upon policy.

* * * * *